United States Patent [19]

Beun et al.

[11] Patent Number: 5,708,742
[45] Date of Patent: Jan. 13, 1998

[54] COMBINATIONS OF PRINTED CIRCUIT BOARDS AND FACE PLATES

[75] Inventors: Roger A. Beun, Kanata; Jay R. Sobel, Nepean, both of Canada

[73] Assignee: Northern Telecom Limited, Montreal, Canada

[21] Appl. No.: 666,702

[22] Filed: Jun. 18, 1996

[51] Int. Cl.⁶ ................................................. G02B 6/36
[52] U.S. Cl. .............................. 385/53; 385/134; 385/137; 385/76
[58] Field of Search ................................. 385/134, 135, 385/137, 139, 53, 55, 76–78

[56] References Cited

U.S. PATENT DOCUMENTS

| | | | |
|---|---|---|---|
| Re. 34,955 | 5/1995 | Anton et al. | 385/135 |
| 5,363,465 | 11/1994 | Korkowski et al. | 385/135 |
| 5,542,015 | 7/1996 | Hultermans | 385/55 |
| 5,553,183 | 9/1996 | Bechamps | 385/97 |
| 5,563,978 | 10/1996 | Kawahara et al. | 385/136 |

*Primary Examiner*—John D. Lee
*Assistant Examiner*—Ellen Eunjoo Kang
*Attorney, Agent, or Firm*—R. J. Austin

[57] ABSTRACT

A printed circuit board with a face plate having a connector support located behind it and being movable for access to the connector support. The connector support has a connector mounting for connecting two fiber connectors, the geometry being such that with the face plate removed, the rearwardly directed connector and accompanying fiber is accessible together with the forwardly directed fiber and connector for cleaning purposes without removal of the circuit board from operational position within a shelf.

9 Claims, 6 Drawing Sheets

COMBINATIONS OF PRINTED CIRCUIT BOARDS AND FACE PLATES

BACKGROUND TO THE INVENTION

1. Field of the Invention

This invention relates to combinations of printed circuit boards and face plates.

2. Prior Art

In existing structures of printed circuit boards to be mounted in shelves, a front face plate is provided. When optical fibers are connected through the face plate, a forwardly extending fiber in front of the face plate is connected by a connector arrangement at the face plate to a fiber which extends rearwardly of the face plate to the printed circuit board. To obtain access to the connection at both sides of the face plate for dismantling and cleaning purposes it is necessary to withdraw the printed circuit board from the shelf. The withdrawing of the printed circuit board from the shelf is accompanied by disconnection of the board from the back plane. With such constructions also, at the face plate the fiber mounted upon the printed circuit board is connected with a fiber extending exteriorly of the front of the face plate by an adaptor which interconnects and lies intermediate optical fiber connections provided at the ends of the two fibers. Removal of the adaptor from the face plate for cleaning or replacement purposes entails removal of an adaptor holding screw from the face plate. Consequently, upon reassembly of the parts, the adaptor has to be aligned manually with the fiber connector extending from the rear of the face plate and this action could damage either the adaptor or the connector.

SUMMARY OF INVENTION

The present invention seeks to provide a combination structure of a printed circuit board and a face plate which lessens the above disadvantages.

In accordance with the present invention, there is provided a combination of a printed circuit board and a front face plate movable into and out of an operative position at a front edge of the printed circuit board, and a connector support mounted upon the printed circuit board in a location to lie immediately behind the face plate when in its operative position, the connector support having a connector mounting for two fiber connectors interconnected at the mounting, one connector directed forwardly from and the other connector directed rearwardly from the face plate, the mounting disposed to permit frontal access to the connector directed rearwardly of the connector support, and the face plate, when in the operative position, obscuring the mounting to prevent access to the rearwardly directed connector, the face plate providing an opening to enable the forwardly directed connector to be interconnected with the rearwardly directed connector at the mounting with the face plate in the operative position.

With combinations according to the invention, the face plate is not itself provided with the connector mounting. As a result of the construction, with the face plate movable away from the operative position, then the mounting which forms part of the connector support as distinct from the face plate, is disposed in such a manner that access to the connector facing rearwardly is provided. It follows, that with combinations according to the invention the printed circuit board may remain in its own position of operation within a shelf while the rearwardly facing connector is reached for disconnection, cleaning and reconnection purposes. The invention also enables a pair of printed circuit boards to be employed side-by-side with the connector support and the face plate both bridging the printed circuit boards and with the mounting in a position to direct the rearwardly directed connector between the two boards. Thus, not only does the invention provide a structure in which the printed circuit board does not require to be removed from its position of operation in a shelf, but also as the rearwardly directed connector is frontally accessible, then two printed circuit boards may be used in the structure. This arrangement then permits the use of a circuit pack having one or two printed circuit boards in a shelf and also having an individual EMI protective shielding on both sides of the assembly of the printed circuit boards and/or the use of a heat sink arrangement at the sides of this assembly for removal of heat.

To allow for access to the rearwardly directed connector, it is preferred that the connector mounting is oriented to carry the connectors extending in an axial direction which is vertically inclined. With such an arrangement, the mounting is accessible from the front of the connector support on both sides of the mounting whereby the rearwardly directed connector is accessible from a forward position with the face plate removed from the operative position. Preferably, the connector mounting comprises resiliently flexible connector gripping elements having a forwardly facing opening for lateral insertion of the rearwardly directed connector.

In a particularly preferred arrangement, a connector adaptor carrier is provided and which is movable towards the gripping elements along a controlled path which moves the connector adaptor in axial alignment with the rearwardly directed connector during the connection process. This preferred arrangement thus avoids manual alignment problems between adaptor and connector and the control which is obtained ensures that positive and aligned connection may be made repeatedly without fear of damage to either the adaptor or to the rearwardly directed connector.

The connector support may be provided as a part of a main front plate with the face plate mounted upon the main plate so as to move into and out of its operative position. Alternatively, the face plate is mounted upon the printed circuit board for movement into and out of its operative position and a separate connector support is provided and which is individually mounted upon the printed circuit board.

BRIEF DESCRIPTION OF DRAWINGS

Embodiments of the invention will now be described, by way of example, with reference to the accompanying drawings, in which.

DESCRIPTION OF PREFERRED EMBODIMENTS

Figure 1:
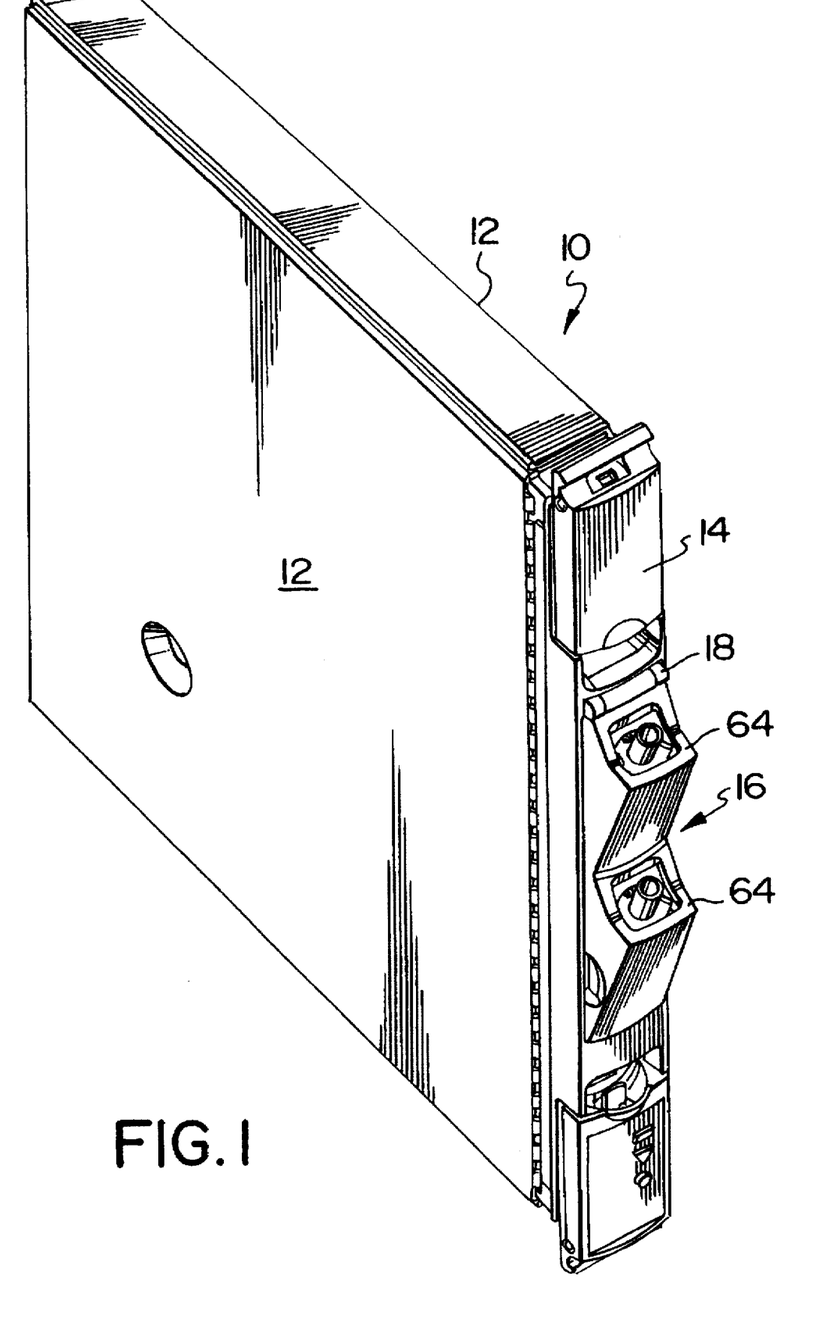
FIG. 1 is a front isometric view from an upper position of a circuit pack which is a combination according to a first embodiment.

In a first embodiment with reference to FIG. 1, a circuit pack 10 comprises two side-by-side spaced-apart printed circuit boards 12 and a main front plate 14 extending across and bridging the front edges of the two circuit boards 12. Main front plate 14 extends from top to bottom of the circuit pack and a front face plate 16 of the main plate 14 is pivoted at an upper pivotal position 18. About the pivot 18 the portion 16 of the face plate is movable between a vertical operative position as shown in FIG. 2 and a second position inclined upwards from the pivot as shown by FIG. 3.

Figures 2, 3:
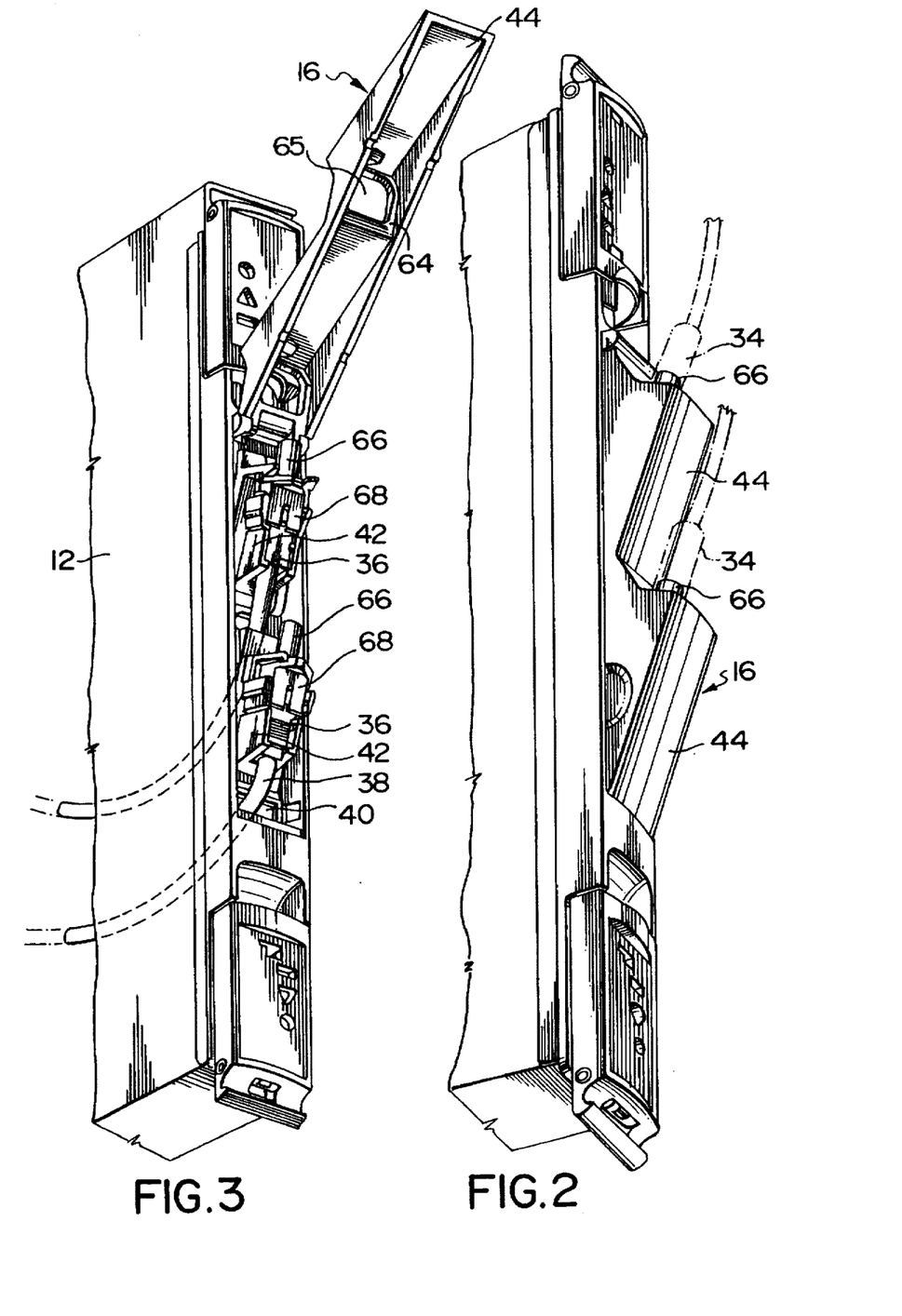
FIG. 2 is a front isometric view from a lower position of the front of the circuit pack and to a larger scale.
FIG. 3 is a view similar to FIG. 2 and showing a portion of a face plate removed from an operative position.
Figure 4:
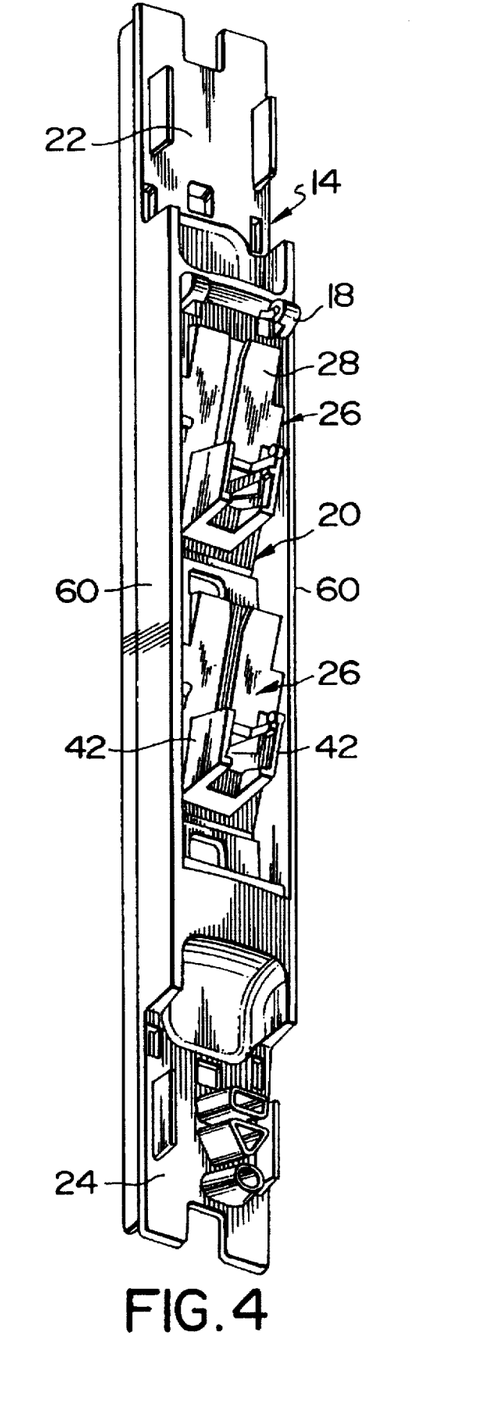
FIG. 4 is a view similar to FIG. 2 and showing details of the structure of a connector support with face plate removed.
Figure 5:
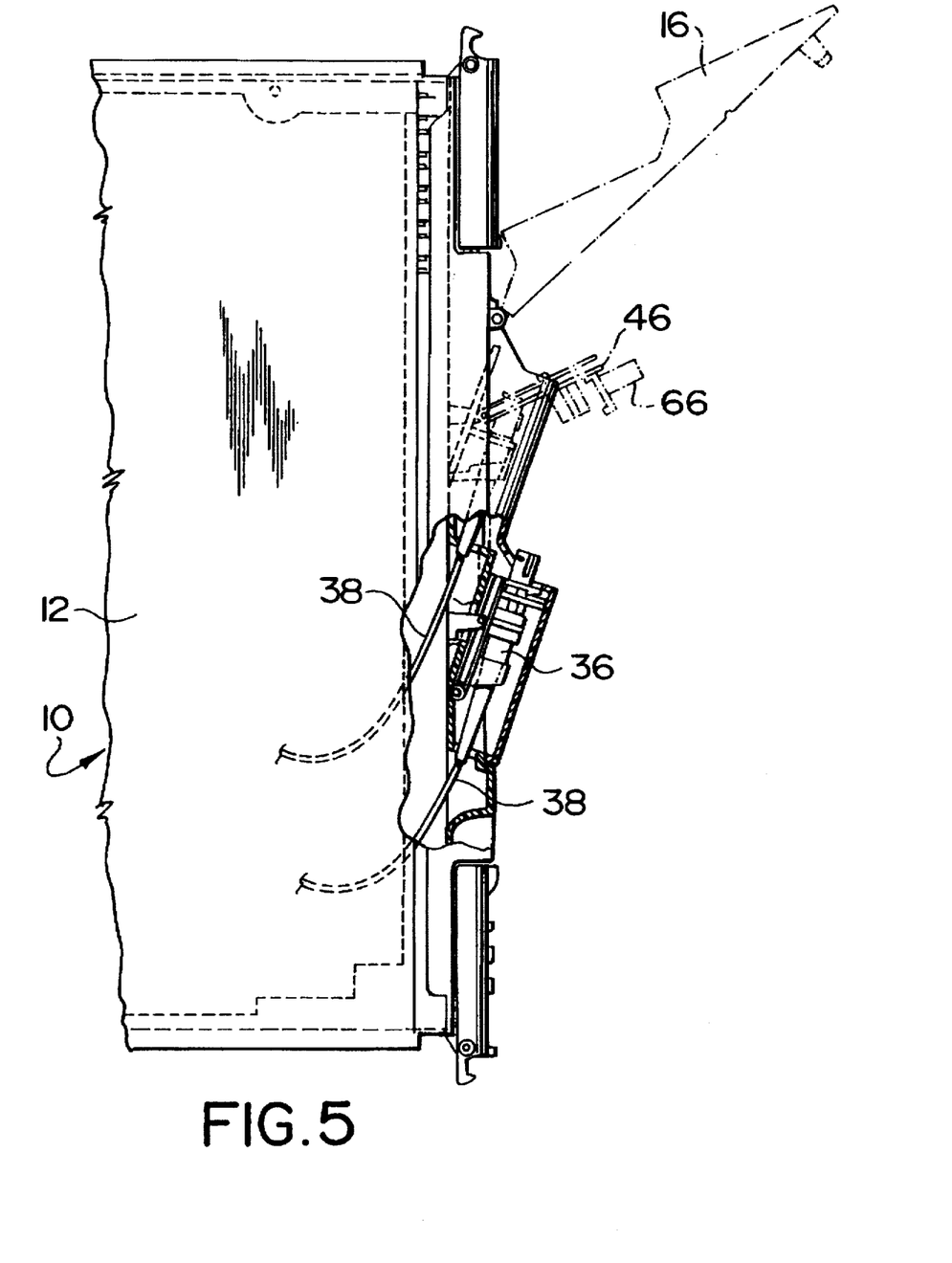
FIG. 5 is a side view, partly in section, of the circuit pack of FIG. 1.

As shown by FIG. 3 and FIG. 4 particularly, directly behind the face plate 16 is disposed a connector support 20. The connector support 20 is integrally formed with top and bottom portions 22 and 24 of the main front plate 14, and is provided with two vertically aligned connector mountings 26 for fiber optic connectors. Each of the mountings 26 is vertically inclined so as to carry optical fiber connectors in an axial direction which is also vertically inclined. For this purpose, each of the mountings 26 has a rear wall 28 which is inclined to the desired orientation to the vertical direction. The wall 28 forms a rigid support for the parts of the mounting which are intended to carry and connect two optical fiber connectors, one connector 34 (FIG. 2) extending forwardly of the mounting and the other connector 36 (FIGS. 3 and 5) extending rearwardly of the mounting, while directing an optical fiber 38 through an orifice 40 provided in the rear of the connector support 20. In each mounting 26 a plurality of resiliently flexible gripping elements are provided for the rearwardly directed connector 36. These gripping elements are provided by two horizontally spaced and vertically extending resiliently flexible gripping flanges 42 (see FIG. 4 in which the connectors and accompanying optical fibers are omitted for reasons of clarity). The resiliently flexible flanges define between them a forwardly facing opening through which the connector 36 is passed for insertion and withdrawal purposes, this movement being performed along a front to rear directional line. FIG. 5 illustrates the connector 36 located in its desired position in a mounting 26. The face plate 16 in its operative position as shown in FIGS. 1 and 2, obscures the flanges 42 and the connectors 36.

Figure 6:
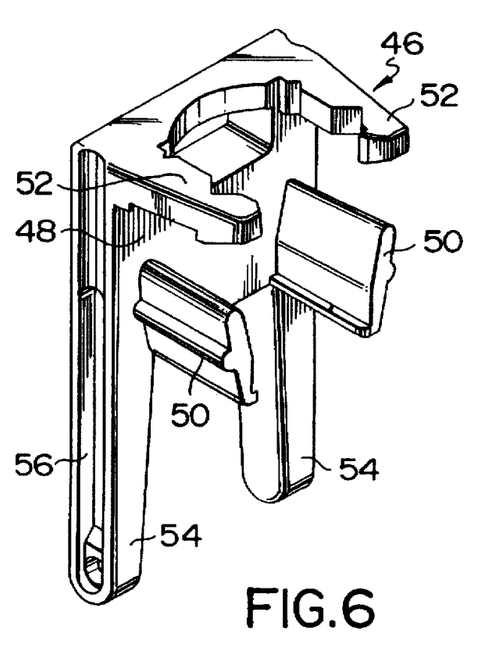
FIG. 6 is a front isometric view of an adaptor carrier and to a larger scale.
Figure 7:
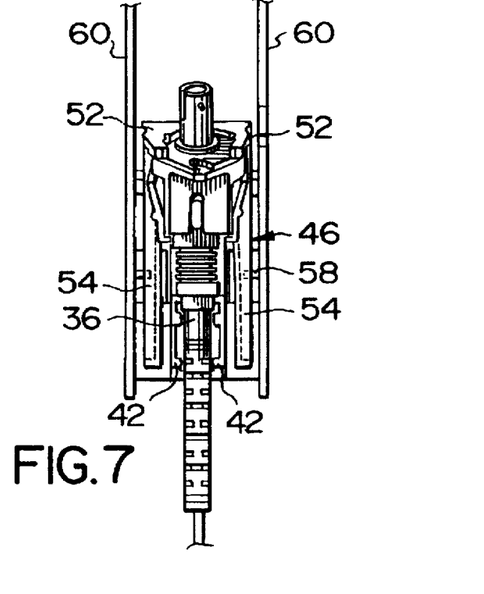
FIG. 7 is a front view of the connector support, adaptor and connector assembly with the adaptor in lower operative position.
Figure 8:
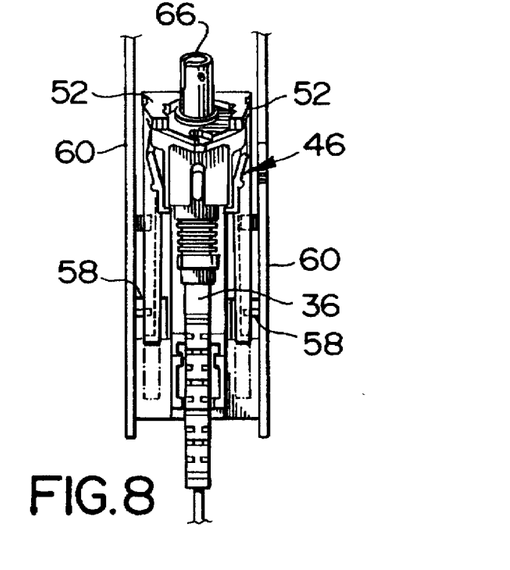
FIG. 8 is a view similar to FIG. 7 with the adaptor in an upper position.

The invention also preferably includes a connector adaptor carrier which is movable towards and away from the gripping elements (i.e. flanges 42) so as to carry an adaptor along a controlled path whereby the adaptor is moved towards and away from the rearwardly directed connector 36 in axial alignment with that connector. The carrier comprises a slidable carrier member 46 (FIG. 6 which shows one such member and FIGS. 7 and 8). Each carrier member 46 as shown in detail in FIG. 6, comprises a rear wall 48 and two forwardly facing converging adaptor holding flanges 50 together with two upper outwardly extending top flanges 52 for holding an upper end of the adaptor. The body extends downwardly and has two guide arms 54 which are spaced apart so as to lie one on each side of the gripping elements 42 (FIGS. 7 and 8). Each arm 54 is provided with a guide slot 56 (FIG. 6) into which is received a guide peg 58 (FIGS. 7 and 8), the guide peg integrally formed with a side wall 60 of the main front plate. The guide arms 54 are resiliently flexible inwards so as to enable them to be removed from between guide pegs 58 for the purpose of removing the adaptor and carrier completely from the main front plate.

In use of the first embodiment, the rearwardly directed connectors 36 are accessible from the front of the circuit pack merely by moving the face plate 16 into its inclined position as shown in FIG. 3. This access which is from the front of the circuit pack is easily performed without any need for removal of the pack from its operational position within a shelf (not shown) in which the circuit pack is connected into the back plane of the shelf. In addition, because there is no need for the connectors 36 to be accessed around the rear of the face plate, then the circuit pack 10 not only may be provided with two printed circuit boards 12 as shown but also may be provided with a heat sink arrangement (not shown) on each side and/or an EMI protection shield (not shown) outwardly from the sides of the printed circuit boards. Hence, with the circuit pack in position within the shelf and with the face plate 16 raised to the position shown in FIG. 3, the mountings 26 are completely exposed.

In the operating position and with reference to FIG. 2, the face plate has inclined walls 44 terminating at their upper ends in upper walls 64 (FIGS. 1 and 3) lying in planes normal to the walls 44. The walls 64 are formed with apertures 65 for acceptance of top ends 66 of adaptors 68 when these are fitted into the carrier members 46. Each adaptor 68 is held between holding flanges 50 of its adaptor 46 by the top flanges 52. As the face plate 16 moves downwardly into the position of FIG. 2, it will only assume the operative or closed position when the carrier members 46 carrying the adaptors 68 are in a lower position, as shown in FIG. 7, in which the carrier members have moved downwardly with the adaptors in alignment with the connectors 36 so that the adaptors become interconnected with the connectors 36. As the face plate 16 moves down, the walls 64 move over the flanges 52 so that the ends 66 of the adaptors pass through the apertures in the walls 64. In the operative position of the face plate as shown in FIG. 2, the walls 64 lie close to the flanges 52 thereby preventing upward movement of the carriers 46 and thus guaranteeing that the adaptors remain in interconnection with the connectors 36. With the face plate 16 in the position shown in FIG. 2, then the outwardly directed connectors 34 are connectable to the upper ends 66 of the adaptors.

To disconnect the connectors from the adaptors 68 and for cleaning the transmission components at the connection position of each mounting 64, it is necessary to remove the forwardly directed connectors 34 to allow the front cover portion to be moved upwards from the FIG. 2 to the FIG. 3 position. Once this has been achieved, and as shown in FIG. 3, the connectors 36 are accessible from the front of the face plate and, to permit their removal, the carriers 46 are both moved upwards from the FIG. 7 to the FIG. 8 position thereby disconnecting the adaptors from these connectors 36 by true axial movement. The connectors 36 may both then be removed by forcing them forwardly from between the resilient gripping flanges 42. The ends of all the connectors may then be cleaned. To provide for efficient cleaning of each of the adaptors 68, then each adaptor 46 is removed from its operational position by resiliently flexing the arms 54 towards each other thereby disconnecting the guide pins 58 from the guide grooves 56. Each adaptor 68 may remain held within its carrier 46 for cleaning purposes, in which position the top end of a flange of the adaptor is held downwardly by the flanges 52 and sideways movement out of its desired axial position of each adaptor is prevented by the converging flanges 50. Once cleaning has been accomplished, then each of the carriers carrying their adaptors is inserted once more into the connector support 20 by reception of the pins 58 in the guide channels 56. With the connectors 36 in place, the carrier is moved from the FIG. 8 to the FIG. 7 position to interconnect the adaptors with the connectors 36. The face plate 16 is then moved down to the operative position in FIG. 2 and with the upper ends 66 of the adaptors 68 projecting through the apertures 65 provided in walls 64, the forwardly directed connectors 34 are once more connected into the adaptors. Alternatively for cleaning purposes, an adaptor 46 when in its upper position of FIG. 8, may be tilted forwardly on the pins 58 as shown chain dotted in FIG. 5 for access to its inside passage.

As may be seen therefore, together with the advantages discussed above in the use of the invention and as shown by the first embodiment, access to all of the connectors carried by the connector support for removal, cleaning and insertion purposes is easily accomplished and, more importantly, this accomplishment is achieved with the circuit pack still in its operational position in its shelf.

It should be noted that in the embodiment and in the second embodiment to follow the connectors 36 are directed to locate fibers extending between the circuit boards 12 for connection into the circuitry. This type of design is made possible by easy access to the connectors themselves at the front of the face plate while enabling a simple design for two spaced apart circuit boards as in the embodiment. These printed circuit boards may also be provided with laterally positioned heat sink arrangements or EMI protection measures as desired, it being unnecessary to interfere with such arrangements or measures when connecting or disconnecting the connectors carried by the connector support.

The above embodiment illustrates the use of the invention in which the connectors are inclined vertically and are disposed with the forwardly directed connectors 34 in the upper positions. However, as may be seen, in a modification (not shown) of the first embodiment, the face plate may be oriented so that a downward inclination is provided with the forwardly directed connectors 34 disposed at the lower ends of their associated connection.

Figure 9:
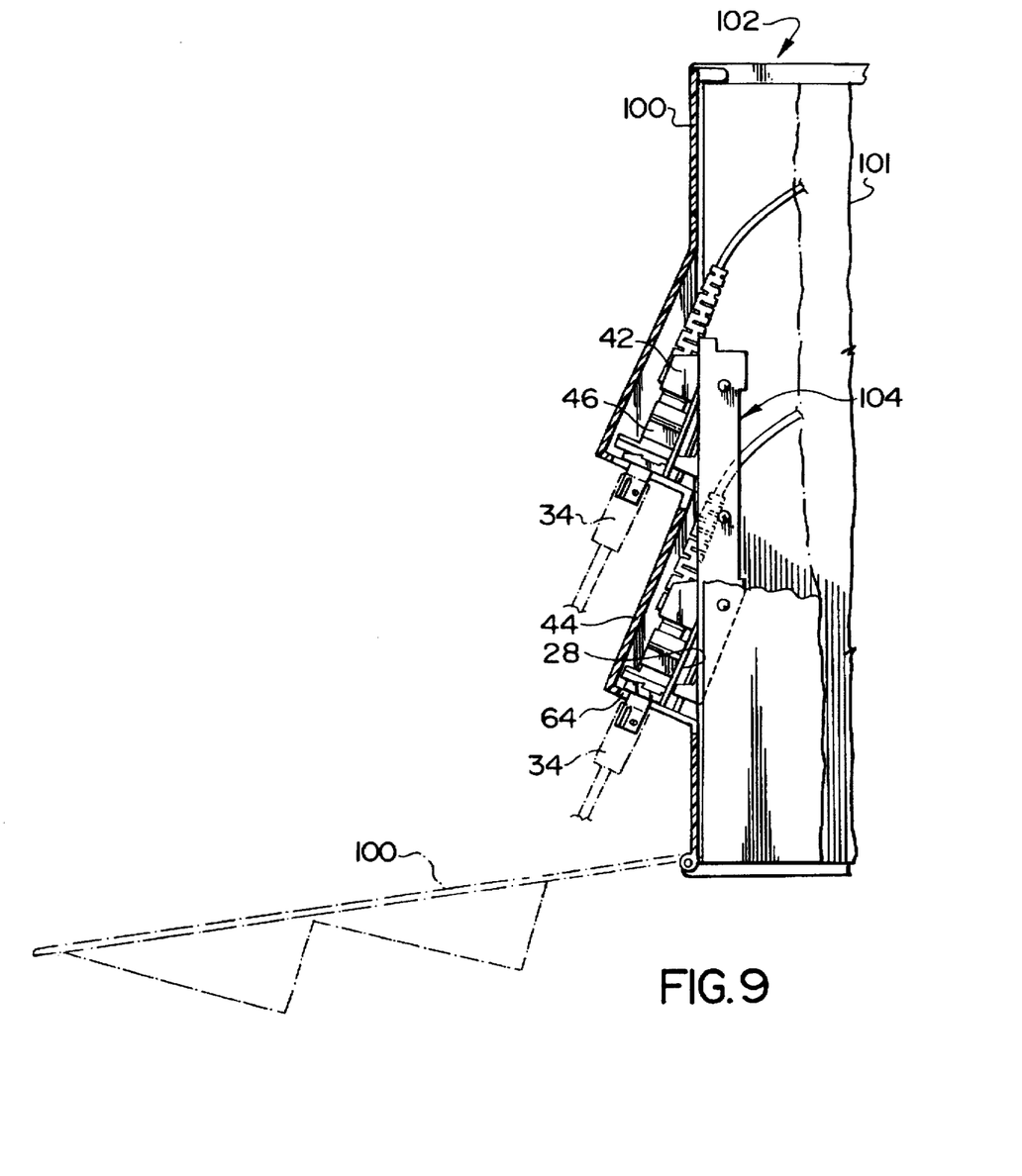
FIG. 9 is a side elevational view, partly in section, of a circuit pack according to a second embodiment.

The construction of the face plate with the connector support need not necessarily be as described in the first embodiment, with the connector support forming part of main front plate which also supports the face plate. For instance, as shown in a second embodiment (FIG. 9), in which the connectors are downwardly inclined as just mentioned above with forwardly facing connectors 34 extending downwardly, a face plate 100 is pivoted at its lower end between two printed circuit boards 101 of a circuit pack 102. A connector support 104 is completely separate from the face plate 100 and is secured in position between front edge regions of the two printed circuit boards. The structure of the connector support 104 is similar to the connector support of the first embodiment in that it is provided with the inclined walls 28, the gripping flanges 42 and the carrier members 46 for the adaptors 68. The face plate 100 is also provided with walls 44 and 64 as described in the first embodiment which, with the face plate in operative position as shown in chain-dotted outline in FIG. 10, are similarly disposed relative to the support to prevent the carrier members 46 from moving out of a position in which the adaptors are connected with the connectors 36. Similarly, ends of the adaptors 68 project through apertures in the walls 64 of the face plate in the second embodiment when the face plate is in its operative position.

What is claimed is:

1. A combination of a printed circuit board and a front face plate movable into and out of an operative position at a front edge of the printed circuit board, and a connector support mounted upon the printed circuit board in a location to lie immediately behind the face plate when this is in the operative position, the connector support having a connector mounting for two optical fiber connectors interconnected at the mounting, one connector directed forwardly from and the other connector directed rearwardly from the face plate, the connector mounting oriented to carry the connectors extending in an axial direction which is vertically inclined so that the rearwardly directed connector, when fitted, is exposed forwardly when the face plate is removed from the operation position to permit frontal access to the rearwardly directed connector, and the connector support comprising spaced resiliently flexible connector gripping elements for the rearwardly directed connector, the elements defining between them a forward facing opening for lateral insertion of the rearwardly directed connector between the elements by resilient flexing of the elements apart, and the face plate, when in the operative position, obscuring the mounting to prevent access to the rearwardly directed connector, the face plate providing an opening to enable the forwardly directed connector to be interconnected with the rearwardly directed connector at the mounting with the face plate in the operative position.

2. A combination comprising:
a printed circuit board;
a face plate movable into and out of an operative position at a front edge of the printed circuit board;
a connector support mounted upon the printed circuit board in a location to be immediately behind the face plate when this is in the operative position, the connector support having a connector mounting for two optical fiber connectors interconnected at the mounting, one connector directed forwardly and the other connector directed rearwardly from the face plate, the connector mounting oriented to carry the connectors extending in an axial direction which is vertically inclined so that the rearwardly directed connector, when fitted, is exposed forwardly when the face plate is removed from the operative position to permit frontal access to the rearwardly directed connector, and the connector support comprising spaced resiliently flexible connector gripping elements for the rearwardly directed connector, the elements defining between them a forward facing opening for lateral insertion of the rearwardly directed connector between the elements by resilient flexing of the elements apart; and
a connector adaptor carrier which is movable towards the gripping elements along a controlled path to move a connector adaptor in axial alignment with the rearwardly directed connector to connect the adaptor to the rearwardly directed connector, the carrier then being movable along the controlled path in the opposite direction to disconnect the adaptor from the rearwardly directed connector;
and the face plate, when in the operative position, obscuring the mounting to prevent access to the rearwardly directed connector, the face plate providing an opening to enable the forwardly directed connector to be interconnected with the rearwardly directed connector at the mounting with the face plate in the operative position.

3. A combination according to claim 2 wherein, with the face plate in the operative position, the carrier is located in a location towards the gripping elements to connect the adaptor and the rearwardly directed connector, the carrier being held in the location towards the gripping elements by the face plate, and the adaptor being accessible through the aperture in the face plate to connect the forwardly directed connector to the adaptor.

4. A combination according to claim 3 wherein the carrier has two guide arms to move the carrier along the controlled path, the arms disposed one upon each side of the gripping elements.

5. A combination according to claim 4 wherein the guide arms are resiliently flexible to allow for removal of the guide arms from a body of the connector support and thus removal of the carrier from the body with the face plate removed from the operative position and thus allow for maintenance of the adaptor.

6. A combination according to claim 3 wherein the carrier is removable from a body of the connector support with the face plate removed from the operative position so as to allow for maintenance of the adaptor.

7. A combination according to claim 2 wherein the connector support is provided integrally with a main front plate and the face plate is movable into and out of the operative position upon the main front plate.

8. A combination according to claim 2 wherein the face plate is mounted upon the printed circuit board for movement into and out of the operative position, and the connector support is separately mounted upon the printed circuit board.

9. A combination according to claim 2 including two printed circuit boards spaced laterally side-by-side and with the face plate and the connector support bridging across front edges of the printed circuit boards and with the support located to direct the rearwardly directed connector between the printed circuit boards.

* * * * *